Patented Aug. 15, 1944

2,355,868

UNITED STATES PATENT OFFICE 2,355,868

CATALYTIC HYDROCARBON REACTIONS AND CATALYSTS THEREFOR

James W. Jean, Altadena, Calif.

No Drawing. Application February 12, 1940, Serial No. 318,557

6 Claims. (Cl. 260—683.15)

This invention pertains to the catalytic reaction of organic compounds and, more particularly, to such reactions in which the catalyst is a solid sulfuric acid.

The amount of energy which is available in the normally gaseous hydrocarbons, containing from two to four carbon atoms per molecule, that accompany natural petroleum and are produced in the cracking of the heavier petroleum fractions for the production of liquid motor fuels is very large. Numerous attempts have been made to transform these low molecular weight hydrocarbons into compounds having the characteristics desirable in a motor fuel so as to make available for that use at least a portion of this energy.

For instance, the possibility of polymerizing the normally gaseous olefin hydrocarbons to liquids boiling within the range of motor fuels has long been recognized and has been realized on a scale of considerable economic importance within the past few years. Various thermal and catalytic methods have been developed for converting the olefins contained in the gases produced during the cracking of petroleum into liquid fuels of high antiknock value. More recently processes for the alkylation of isoparaffins by means of normally gaseous olefins have attracted very considerable attention. This reaction is most directly applicable to the $C_4$ or butane-butene hydrocarbon fraction and has the decided advantage over the polymerization reaction of making available roughly twice the quantity of motor fuel by a single step process from the same quantity of olefin.

While under most conditions the alkylation reaction has very decided advantages over polymerization there are situations in which it is desirable to use both in order to most effectively utilize the raw materials available.

Since in any given hydrocarbon fraction such, for instance, as the butane-butene cut derived from either natural gas or cracking still gases the amount of normal paraffin is usually at least twice the amount of isoparaffin, it is generally desirable to isomerize as much of the former as possible in order to provide adequate isoparaffin for the alkylation reaction.

Still another hydrocarbon reaction which has been found highly desirable under certain circumstances in the present day struggle for the maximum of high quality motor fuel from each barrel of crude oil produced is the reaction of a hydrocarbon molecule boiling above the motor fuel range with one boiling below that range whereby two molecules boiling within the range are produced. This reaction has been referred to as "disproportionation."

The direct catalytic hydration of the normally gaseous olefins, and particularly ethylene and propylene, to the corresponding alcohols is of very considerable importance both to the economical utilization of these by-product gases and also to the provision of substantially unlimited supplies of these chemical raw materials in times of emergency.

The direct catalytic esterification of the lower fatty acids, such as formic, acetic and propionic acids by reacting them with the appropriate olefins, such as ethylene, propylene or the butenes is also of considerable economic significance.

All of the foregoing organic reactions and many others are catalyzed to a greater or less degree by concentrated aqueous sulfuric acid under appropriate conditions of concentration, pressure and temperature. While sulfuric acid is one of the cheapest bulk chemicals and is a very desirable catalyst from that standpoint, the use of large volumes of a strong and highly corrosive acid as a catalyst under pressure, and hence in metal equipment, is accompanied by numerous well recognized difficulties. A catalyst which would possess the wide range of catalytic activity of liquid sulfuric acid, be low in cost and at the same time would eliminate the corrosion and safety hazards of the bulk liquid acid catalyst has accordingly been the subject of widespread search.

It is an object of the present invention to provide a dry solid catalyst having substantially the same catalytic activity for the same reactions as is shown by strong liquid sulfuric acid.

It is another object of the present invention to provide a method of converting the normally gaseous hydrocarbons, and particularly those of three and four carbon atoms per molecule, into liquid motor fuels by means of a catalyst having substantially the catalytic power of sulfuric acid in a solid form in which its catalytic intensity can be varied substantially at the will of the operator.

It is a more specific object of the present invention to provide a process for the polymerization of normally gaseous olefins by means of a solid catalyst having substantially the polymerizing power of liquid sulfuric acid.

It is another specific object of the present invention to provide a process for the alkylation of isoparaffins with olefins by means of a solid sulfuric acid catalyst.

It is another object of the present invention to provide a catalyst in solid form for effecting a variety of organic reactions comparable to those known to be effected by liquid sulfuric acid.

It is a more specific object of my invention to provide a catalyst useful in polymerization, copolymerization, condensation, alkylation, isomerization, disproportionation, hydration, dehydration, esterification, and similar reactions, usually catalyzed by strong liquid sulfuric acid, which is in solid form and is consequently less corrosive to metal equipment and safer to handle than is liquid sulfuric acid.

Other important objects of my invention will be apparent from the following discussion and description and the appended claims.

In the preparation of a catalyst for any given reaction a considerable number of factors must be taken into account in addition to catalytic activity for the particular reaction or set of reactions desired such as, for instance, the ruggedness of the catalyst material, the cost of ingredients, the tendency to promote undesired side reactions, the duration of catalytic activity or catalyst life, the readiness with which catalytic activity once lost may be restored, etc. I have found that in the production of a solid catalyst having substantially the catalytic power of liquid sulfuric acid, which will hereinafter be referred to as a "solid sulfuric acid" catalyst, the foregoing significant factors can be largely controlled and predetermined by combining in the proper proportions several ingredients of different types, each selected to contribute some specific quality to the finished catalyst. For instance, I have found that by adding to concentrated aqueous sulfuric acid, containing about 93% $H_2SO_4$, a compound of boron to control the catalytic intensity of the acid, an active metal ion to control the range of activity, an inert carrier to absorb and carry the active ingredients and a cementing and/or hardening agent to give mechanical strength and durability to the mass, a solid sulfuric acid catalyst of wide applicability may be produced.

In preparing my solid sulfuric acid catalysts I usually employ boric acid in order to control the catalytic activity of the sulfuric acid; however, other boron compounds such as boric anhydride or sodium tetraborate may be used with substantially equal advantage if desired. The proportion of boron compound which is necessary to control the activity of the sulfuric acid over the range usually desired will be found to be such as to establish a ratio of boron to sulfuric acid between about one atom of boron to three molecules of sulfuric acid and one atom of boron to four molecules of sulfuric acid. For instance, in a preferred composition I may employ 1500 cc. of commercial concentrated sulfuric acid (93% $H_2SO_4$) and 500 grams of boric acid giving a ratio of atoms of boron to molecules of sulfuric acid of 1 to 3.4. The boric acid is dissolved in the sulfuric acid at substantially room temperature whereupon some heat is liberated indicating the possible formation of a compound between the boric and sulfuric acids such, for instance, as boryl sulfate. When no active metal modifying agent is necessary to adjust the range of catalyst activity desired this composition is then ready for incorporation with the inert carrying and spacing material as indicated above.

The inert carriers which have been found well adapted to preparation of the solid sulfuric acid catalysts of the present invention belong in general to the class usually identified as siliceous and/or aluminous materials including diatomaceous earth, kieselguhr, infusorial earth, artificially prepared silica products such as "Sil-O-Cel" and "Celite," various clays such as bentonite, kaolin, fullers earth, artificially prepared aluminum silicates such as "Tonsil," ground asbestos, ground shale, ground mica, pumice, etc. The carrier may be added to the sulfuric acid-boric acid mixture or the reverse, as may be more convenient, care being taken to effect the uniform distribution of the acid on the carrier. The quantity of carrier per unit of acid mixture may be varied as desired but should usually be sufficient to give a composition having the consistency of a moderately stiff paste; for instance, with the 1500 cc. of sulfuric acid and 500 grams of boric acid mentioned above, about 600 grams of infusorial earth will be found to give about the right consistency.

When it is desired to modify somewhat the natural range of catalyst activity of the sulfuric acid toward reactions involving hydrocarbons, it has been found that a small proportion of the oxide or sulfate of a metal of the class known to activate the carbon to hydrogen bond as, for instance, in promoting hydrogenation, dehydrogenation, or isomerization reactions such as copper, zinc, nickel, cobalt and chromium, may be added to the sulfuric acid-boric acid mixture prior to incorporation of the latter with the inert carrier material. A preferred composition may thus include 1500 cc. of sulfuric acid, 500 grams of boric acid, 500 grams of copper sulfate and 600 grams of infusorial earth.

In order to convert the paste of active ingredients and inert carrier material above described into a hard, dry, rugged catalyst capable of withstanding rough industrial service, it has been found that any one of several cementing and hardening oxides, or a mixture of two or more of them, may be added. The addition of this cementing agent is by far the most critical step in the preparation of a satisfactory solid sulfuric acid catalyst due to the fact that a rather intense chemical reaction takes place between the cementing oxide and the sulfuric acid-boric acid mixture which tends to solidify the whole mass with considerable rapidity and thus to require thorough mixing within a period of a very few minutes in order to insure a catalyst of uniform composition and activity. It is thus desirable to select a metal oxide of moderate rather than violent reactivity with sulfuric acid. The oxide which I prefer to use for this purpose is aluminum oxide either as such or in one of its hydrated forms. Other oxides that may be used in place of or in combination with aluminum oxide are ferrous oxide, zinc oxide, vanadium oxide, titanium oxide and mixtures of two or more of them. As will be readily appreciated, these several oxides will react with quite different rapidity with the sulfuric-boric acid composition and hence the method of incorporation and the quantity used may be regulated in order to produce a catalyst of proper ultimate hardness and at the same time one which does not harden so rapidly as to preclude uniform mixing. When hydrated aluminum oxide is employed it will be found that about 500 grams are sufficient to harden the above mixture of sulfuric acid-boric acid and carrier.

Examples of my preferred solid sulfuric acid catalysts would thus be substantially as follows:

EXAMPLE 1

| | | |
|---|---|---|
| Commercial sulfuric acid | cc | 1,300 to 1,800 |
| Boric acid | grams | 500 |
| Infusorial earth | do | 600 |
| Aluminum oxide | do | 500 |

EXAMPLE 2

| | | |
|---|---|---|
| Sulfuric acid | cc | 1,300 to 1,800 |
| Boric acid | grams | 500 |
| Copper sulfate | do | 500 |
| Infusorial earth | do | 600 |
| Hydrated aluminum oxide | do | 500 |

When the catalyst prepared substantially as above described has attained its maximum hardness, which may be in a few minutes and in any event it will not be longer than a few hours, it is ground or crushed and screened to the proper size for catalyst use in the desired system, for instance, through a 4-mesh screen and retained by a 20-mesh screen.

The solid sulfuric acid catalysts described have two outstanding advantages over liquid sulfuric acid as a catalyst: first, they may be employed at substantially higher temperatures than are possible with free sulfuric acid without oxidation and/or carbonization of the organic materials undergoing reaction and, secondly, they are substantially noncorrosive when used in metal equipment of any sort. In addition, these solid catalysts have the advantage of being adjustable to the particular reaction desired through a proper choice of the ratio of boron to sulfuric acid and of the identity and amount of hydrogen activating metal ion employed.

In one specific embodiment of the present invention normally gaseous olefins, such as those produced during the cracking of petroleum fractions or by the dehydrogenation of the corresponding paraffins alone or in admixture with paraffins, are polymerized by means of the solid sulfuric acid catalysts above described. When a butane-butene cut from the cracking reaction is thus subjected to polymerization by the catalyst of Example 1 at a temperature between about 240 to 260° F. under a pressure of 250 lbs. per sq. in. the liquid polymer produced will be found to boil at least 90% within the temperature range of 200 to 240° F. With various other mixtures containing olefins the temperature of polymerization may be as high as 350° F. and the pressure 500 lbs. per sq. in. or above as required for best operation. The olefin containing raw material, preferably in liquid phase, is passed at the appropriate pressure and temperature as above explained over the solid catalyst supported in any well known form of reaction chamber provided with means for the ready dissipation of the heat liberated by the polymerization reaction. This phase of the invention may be better understood by reference to the following example:

EXAMPLE 3

A butane-butene fraction from the liquid phase cracking of a California distillate having approximately the following composition:

| | Per cent |
|---|---|
| $C_3$ and lighter | 3.0 |
| Isobutene | 17.5 |
| Normal butenes | 26.5 |
| Isobutane | 18.0 |
| Normal butane | 34.6 |
| $C_5$ and heavier | 0.4 |
| | 100.0 | was passed at approximately 250° F. and 250 lbs. per sq. in. pressure over the catalyst of Example 1 whereby a polymer liquid having the following characteristics was produced:

| | |
|---|---|
| Gravity | 63.4 |
| Sulphur | 0.049 |
| Bromine number | 122.7 |
| Octane number | 97.6 |

(of hydrogenated polymers)

A. S. T. M. distillation:

| | | |
|---|---|---|
| Start | °F | 162 |
| 5% over at | °F | 199 |
| 10% over at | °F | 208 |
| 20% over at | °F | 215 |
| 30% over at | °F | 218 |
| 40% over at | °F | 219 |
| 50% over at | °F | 220 |
| 60% over at | °F | 221 |
| 70% over at | °F | 223 |
| 80% over at | °F | 225 |
| 90% over at | °F | 233 |
| 95% over at | °F | 254 |
| End point | | 340 |
| Recovery | per cent | 98.5 |

It will be noted that the initial boiling point of the polymer liquid produced in Example 3 was somewhat higher than is usually desirable in a finished motor fuel. When, however, the catalyst of Example 2 was employed with the same charging material and under substantially the same operating conditions as in Example 3, 20% of the resulting polymer liquid was found to boil between 80° F. and 200° F., thus giving a liquid of adequate volatility for any ordinary motor fuel use.

In another specific adaptation of the present invention isobutane may be alkylated by the butene by means of the above described solid sulfuric acid catalysts. One specific example of such operation is as follows:

EXAMPLE 4

A hydrocarbon liquid containing isobutane and normal butene was passed over the catalyst of Example 2 at a temperature of 105° F. and a pressure of 50 lbs. per sq. in. A hydrocarbon liquid having the following characteristics was produced in good yield:

*Inspections*

| | | |
|---|---|---|
| Gravity, °A.P.I. | | 56.0 |
| Vapor pressure, Reid | | 2½ |
| Bromine No. | | 28 |
| Sulfur | | 0.013 |

A. S. T. M. distillation:

| | | |
|---|---|---|
| Start | °F | 178 |
| 5% | °F | 208 |
| 10% | °F | 214 |
| 20% | °F | 219 |
| 30% | °F | 222 |
| 40% | °F | 224 |
| 50% | °F | 227 |
| 60% | °F | 230 |
| 70% | °F | 234 |
| 80% | °F | 240 |
| 90% | °F | 252 |
| 95% | °F | 268 |
| End point | | 302 |
| Recovery | per cent | 99 |
| Octane No. of original stocks, C. F. R. | | 74.1 |
| Octane No. of hydrogenated stock, C. F. R. | | 75.3 |

Example 5

In still another experiment a mixture of benzene, butene and butane was passed over a solid sulfuric acid catalyst, prepared as described above, at 170° F. and a rate of 50 cc. per minute. A good yield of hydrocarbon liquid having the following characteristics was recovered:

Inspections

| | |
|---|---|
| Gravity, °A.P.I. | 59.7 |
| Color | Water white |
| Bromine No. | Nil |
| A. S. T. M. distillation: | |
| Start | °F 108 |
| 5% | °F 211 |
| 10% | °F 213 |
| 20% | °F 219 |
| 30% | °F 223 |
| 40% | °F 227 |
| 50% | °F 230 |
| 60% | °F 234 |
| 70% | °F 240 |
| 80% | °F 251 |
| 90% | °F 268 |
| 95% | °F 292 |
| End point | °F 298 |
| Residue per cent | 2.4 |
| Loss per cent | 1.6 |

If in the preparation of the solid sulfuric acid catalyst an adequate quantity of the boron compound limiting agent is employed, the tendency of the catalyst to produce gums and become contaminated thereby, thus ultimately requiring regeneration, is reduced to a substantial minimum. When, however, regeneration is required it may be effected by well known means such as by extraction with an appropriate solvent or by partial oxidation.

The solid sulfuric acid catalysts of the present invention are, as previously indicated, also applicable to other organic reactions than the polymerization and alkylation reactions specifically exemplified and in general will be found suitable, with proper adjustment of conditions, to the catalysis of all such reactions as are ordinarily catalyzed by liquid sulfuric acid. In this connection the direct catalytic hydration of olefins to alcohols is worthy of especial mention. The olefin mixed with steam is passed at a temperature of between about 200° F. and 400° F., and preferably under superatmospheric pressure, over the catalyst held in an appropriate reaction vessel. The alcohol produced is condensed or scrubbed from the unreacted olefin which may then be returned to the reaction.

Having now fully explained and exemplified my improved method of effecting organic reactions by means of a solid sulfuric acid catalyst, the catalyst therefor and the method for its preparation, I claim as my invention:

1. A solid sulfuric acid catalyst useful in promoting organic reactions comprising sulfuric acid, a compound of boron, an inert siliceous carrier therefor and a metal oxide cementing agent adapted to impart hardness to the composition.

2. A solid sulfuric acid catalyst useful in promoting organic reactions comprising concentrated sulfuric acid, boric acid, infusorial earth and aluminum oxide.

3. A catalyst as in claim 2 wherein the ratio of atoms of boron to molecules of sulfuric acid is between about one to three and one to four.

4. A solid sulfuric acid catalyst useful in promoting organic reactions comprising the following ingredients in substantially the following proportions:

| | |
|---|---|
| Concentrated sulfuric acid cc | 1,500 |
| Boric acid grams | 500 |
| Infusorial earth do | 600 |
| Hydrated aluminum oxide do | 500 |

5. A process for the polymerization of normally gaseous olefin hydrocarbons to convert the same into liquid hydrocarbons suitable for motor fuel, which comprises subjecting the said gaseous olefin hydrocarbons to the action of a solid sulfuric acid catalyst comprising sulfuric acid, a compound of boron, an inert siliceous carrier therefor and a metal oxide cementing agent adapted to impart hardness to the composition.

6. A process for the polymerization of normally gaseous olefin hydrocarbons to convert the same into liquid hydrocarbons suitable for motor fuel, which comprises subjecting the said gaseous olefin hydrocarbons to the action of a solid sulfuric acid catalyst comprising concentrated sulfuric acid, boric acid, an inert support therefor, and aluminum oxide, at a temperature between about 200° F. and 350° F. and at superatmospheric pressure.

JAMES W. JEAN.